US012717942B2

(12) United States Patent
Friel et al.

(10) Patent No.: US 12,717,942 B2
(45) **Date of Patent: *Aug. 25, 2026**

(54) SERVERLESS IDENTITY MANAGEMENT

(71) Applicant: Cisco Technology, Inc., San Jose, CA (US)

(72) Inventors: Owen Friel, Salthill (IE); Richard Lee Barnes, Arlington, VA (US)

(73) Assignee: Cisco Technology, Inc., San Jose, CA (US)

( * ) Notice: Subject to any disclaimer, the term of this patent is extended or adjusted under 35 U.S.C. 154(b) by 60 days.

This patent is subject to a terminal disclaimer.

(21) Appl. No.: 18/887,978

(22) Filed: Sep. 17, 2024

(65) Prior Publication Data

US 2025/0013766 A1 Jan. 9, 2025

Related U.S. Application Data

(63) Continuation of application No. 17/377,937, filed on Jul. 16, 2021, now Pat. No. 12,105,817.

(51) Int. Cl.

*G06F 21/62* (2013.01)
*H04L 9/08* (2006.01)
*H04L 9/40* (2022.01)

(52) U.S. Cl.

CPC ............ *G06F 21/62* (2013.01); *H04L 9/0819* (2013.01); *H04L 63/0428* (2013.01)

(58) Field of Classification Search

CPC ...... G06F 21/62; G06F 21/6245; G06F 21/45; H04L 9/0819; H04L 9/0822; H04L 9/0894; H04L 9/14; H04L 63/0428; H04L 63/102

See application file for complete search history.

(56) References Cited

U.S. PATENT DOCUMENTS

| | | | | |
|---|---|---|---|---|
| 8,341,427 | B2 * | 12/2012 | Auradkar | H04L 9/3271 713/192 |
| 8,995,665 | B1 | 3/2015 | Tsaur et al. | |
| 9,912,474 | B2 * | 3/2018 | Gupta | H04L 9/0825 |
| 2015/0058629 | A1 | 2/2015 | Yarvis et al. | |
| 2015/0149772 | A1 * | 5/2015 | Leavy | H04L 63/06 713/168 |

(Continued)

OTHER PUBLICATIONS

S. Contiu, S. Vaucher, R. Pires, M. Pasin, P. Felber and L. Réveillère, "Anonymous and Confidential File Sharing over Untrusted Clouds," 2019 38th Symposium on Reliable Distributed Systems (SRDS), 2019, pp. 21-2110, doi: 10.1109/SRDS47363.2019.00013.

*Primary Examiner* — Han Yang
(74) *Attorney, Agent, or Firm* — Lee & Hayes, P.C.

(57) ABSTRACT

This disclosure describes techniques for allowing an organization to manage user identities. In some examples, the management of user identities may be serverless. In some examples, serverless identity management may be enabled through a distributed application on user devices of the organization. The application may generate and/or store information related to the user identities on the user devices. Serverless identity management may further include storing at least some of the information at a location that is easily accessible to the user devices, such as a cloud computing location, while maintaining security for private data. Serverless identity management may therefore provide an organization with greater operational flexibility.

20 Claims, 8 Drawing Sheets

(56) References Cited

U.S. PATENT DOCUMENTS

| | | | | |
|---|---|---|---|---|
| 2016/0080149 | A1* | 3/2016 | Mehta | H04W 12/08<br>713/165 |
| 2021/0226780 | A1* | 7/2021 | Racz | H04L 63/0435 |
| 2023/0016036 | A1 | 1/2023 | Friel | |

* cited by examiner

SERVERLESS IDENTITY MANAGEMENT

RELATED APPLICATIONS

This application is a continuation of and claims priority to U.S. patent application Ser. No. 17/377,937, filed Jul. 16, 2021.

TECHNICAL FIELD

The present disclosure relates generally to management of user identities to help ensure security for an organization, including secure communications with entities outside the organization.

BACKGROUND

Organizations use a variety of measures to ensure security of information, such as communications among individuals associated with the organization. A precursor for securing information may include generation of user identities for individuals associated with the organization, such as employees, members, customers, contractors, and administrators. Furthermore, a precursor for implementing secure, end-to-end encryption is verifying the identity of other participants that you are communicating with, whether that be in a meeting, on an audio or video call, in a group chat, in a push-to-talk exchange, or any other form of communications media. A user identity may be associated with a device of a user, and may also be associated with security features, such as public/private key pairs, a root of trust, etc. For instance, an approved user identity may be able to securely communicate sensitive data with another approved user identity of the organization. Management of user identities may include generation of user identities, verification of user identities, and ongoing management of user identity data or other information. Therefore, management of user identities may be integral to the operations and/or security of an organization.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. In some cases, letters and/or parentheticals are utilized after a reference number to distinguish like elements. Use of the reference number without the associated letter or parenthetical is generic to the element. The systems depicted in the accompanying figures are not to scale and components within the figures may be depicted not to scale with each other.

DESCRIPTION OF EXAMPLE EMBODIMENTS

Overview

Figure 1:
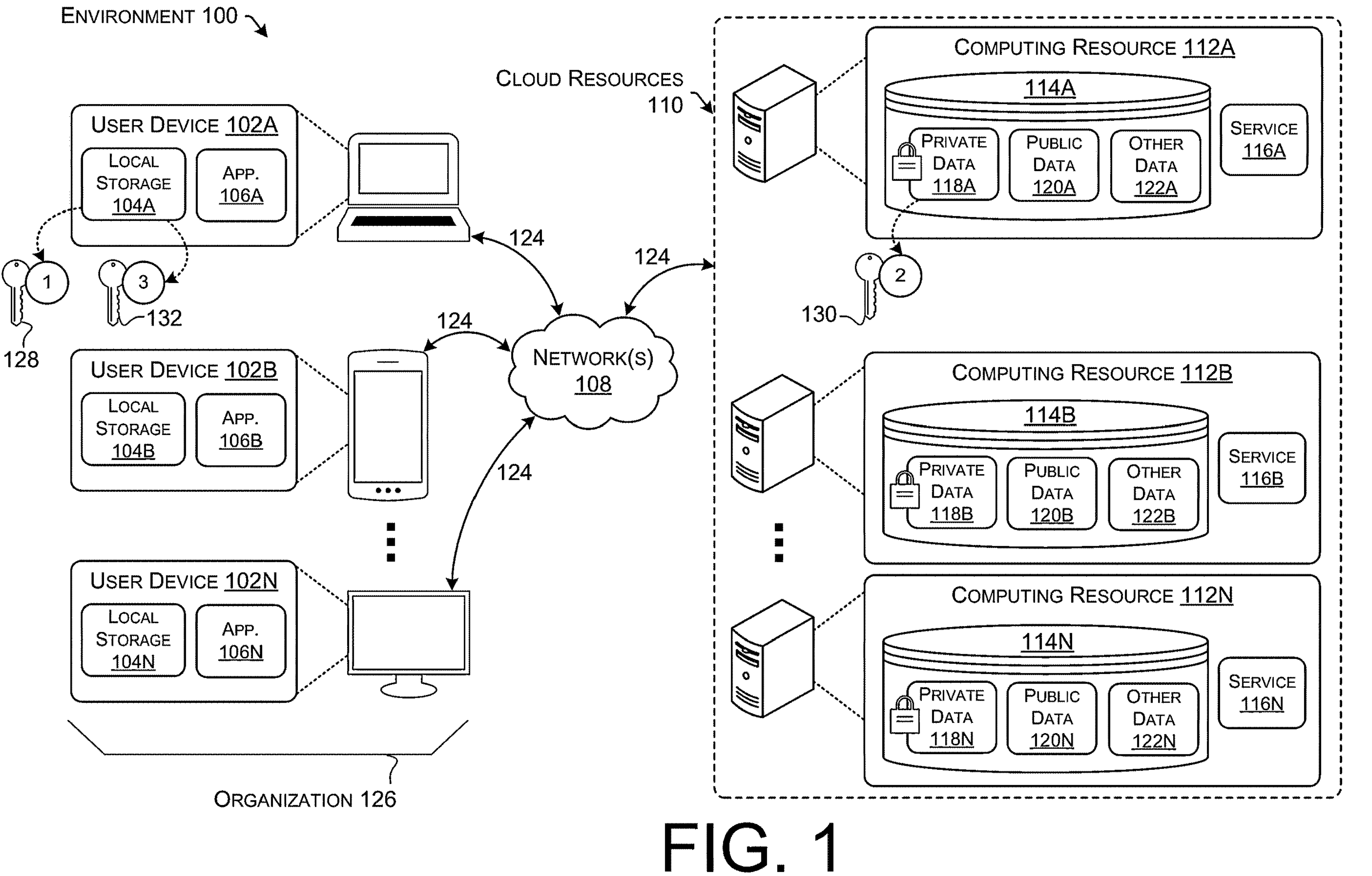
FIGS. 1-4 illustrate component diagrams with example environments in which serverless identity management techniques may be employed as part of communications between network devices, in accordance with the present concepts.

This disclosure describes, at least in part, a method that may be implemented by a user device communicatively coupled to one or more computing resources. The method may include sending, from the user device and to the one or more computing resources, a request for an encrypted cloud key associated with encrypted private data. The method may also include receiving, from the one or more computing resources, the encrypted cloud key. Further, the method may include accessing a local key stored at the user device. Using the local key, the method may include decrypting the encrypted cloud key to produce a decrypted cloud key. The method may also include accessing an encrypted data key stored at the user device. Using the decrypted cloud key, the method may include decrypting the encrypted data key to produce a decrypted data key. Finally, the method may include decrypting the encrypted private data using the decrypted data key to produce decrypted private data.

This disclosure also describes, at least in part, a method that may be implemented by a computing resource communicatively coupled to one or more user devices. The method may include receiving a request for encrypted private data from a user device. Also, the method may include receiving identity information from the user device. The method may include determining that the identity information corresponds to a user identity that is authorized to access the encrypted private data. Based at least in part on the request and determining that the user identity is authorized to access the encrypted private data, the method may include sending the encrypted private data to the user device. Further, based at least in part on determining that the identity information corresponds to the user identity, the method may include sending an encrypted cloud key to the user device. The encrypted cloud key may correspond to the user identity, for instance.

Additionally, the techniques described herein may be performed by a system and/or device having non-transitory computer-readable media storing computer-executable instructions that, when executed by one or more processors, performs the methods described above.

EXAMPLE EMBODIMENTS

This disclosure describes techniques for allowing an organization to manage user identities. In some examples, the management of user identities may be accomplished in a "serverless" manner, without requiring a dedicated server of the organization to be online. For instance, serverless identity management may be enabled through an application on user devices of the organization. The application may generate and/or store information related to the user identities on the user devices. Serverless identity management may further include storing at least some of the information at a location that is accessible to approved user devices of the organization, such as a cloud computing location. Stated another way, the user identities may be managed in an indirect, or distributed manner. Serverless identity management may therefore provide an organization with a security environment that features flexibility for operations, administration, and system architecture.

Serverless identity management may include techniques for establishing trust between entities of an organization.

Entities may include any of a variety of individuals, equipment, or resources associated with the organization that may be assigned a user identity. The organization may be any type of corporation, employer, club, system, group of people, group of things, etc. In some cases, establishment of trust may be performed when inducting a new entity into an organization or system. For example, hiring a new employee may include creation of a new user identity for the new employee, and provisioning the new user identity and/or a user device of the new employee with a way to be trusted by the organization. In some cases, the new user identity may be provisioned with a certificate that is trusted by the organization, for instance. Conversely, the new user identity may be informed of an identity of the organization that the new user identity may trust. For instance, the new user identity may be informed of the identity authority of the organization into which the new user identity has been inducted. Serverless identity management may also include techniques for ongoing operations, such as verifying an existing user identity, communicating securely, etc.

In some examples, the present serverless identity management techniques may include establishing trust between entities of an organization and/or performing ongoing operations without any of the entities involved being a dedicated server of the organization. In some implementations, interaction among the entities of the organization may be indirect with respect to the organization. For instance, interactions of establishing trust and/or ongoing operations may happen via cloud computing resources. Participation of the entities of the organization may be performed through an internet browser, a mobile application on a mobile user device, etc. Further, information regarding the interactions may be received and/or stored in the cloud, rather than on a server of the organization, so that any approved entity of the organization may access the information. However, having private and/or sensitive information stored in the cloud may present a security risk for the organization. Therefore, serverless identity management techniques may include securing information in the cloud to prevent nefarious use of the information, such as stealing data, impersonating a user, listening in on a private conversation, etc. Also, the information may be secure in the cloud without relying on a third party provider to manage identities.

Serverless identity management techniques may be viewed as enabling a group of participants to each authenticate each other. The techniques may be used to authenticate a user for a wide variety of applications, such as communicating (e.g., real time communication, messaging), signing documents and/or verifying signatures on documents, managing distributed information, operating video systems on IP phones, etc. Furthermore, serverless identity management techniques may be used by an entity outside a particular group to verify a user identity as well. For instance, as long as an entity has been configured to trust the authority for the particular group, the entity can verify user identities of individuals within the particular group. An example may include an internet of things (IoT) network in which serverless identity management techniques are used to manage user identities for a group of administrators. In this example, nodes of the IoT network may be configured to trust any of the identified administrators of the group. Therefore, serverless identity management techniques may be applied to communication or other interaction not just within a group, but also outside the group.

To summarize, serverless identity management techniques may be implemented by a simple, lightweight application on user desktops and/or mobile devices. The techniques may include generation of cryptographic keys on the application, and storage of cryptographic keys in the user device storage or keychain, for instance. The techniques may enable users to create, manage, and verify user identities, with which the cloud may not tamper. The user identities may be cryptographically verifiable as belonging to the organization. The techniques may also allow users to create and manage identities without requiring deployment of servers on premise, and without relying on a third party provider. Among other activities, the user identities may be used to participate in secure communications, even end-to-end encrypted communications via a cloud communication service with entities outside the organization. In some cases, the end-to-end encrypted communications may be provided via an untrusted cloud service, yet remain secure. As such, serverless identity management may help improve management of operations while ensuring security for an organization.

Although the examples described herein may refer to a user device and/or a cloud computing resource, the techniques can generally be applied to any device in a network. Further, the techniques are generally applicable for any network of devices managed by any entity where virtual resources are provisioned. In some instances, the techniques may be performed by software-defined networking (SDN), and in other examples, various devices may be used in a system to perform the techniques described herein. The devices by which the techniques are performed herein are a matter of implementation, and the techniques described are not limited to any specific architecture or implementation.

The techniques described herein provide various improvements and efficiencies with respect to network communications. For instance, the techniques described herein may reduce the amount of computational resource use, storage, dropped data, latency, and other issues experienced in networks due to lack of network resources, overuse of network resources, issues with timing of network communications, and/or improper routing of data. By improving network communications across a network, overall performance by servers and virtual resources may be improved.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

Figure 2:
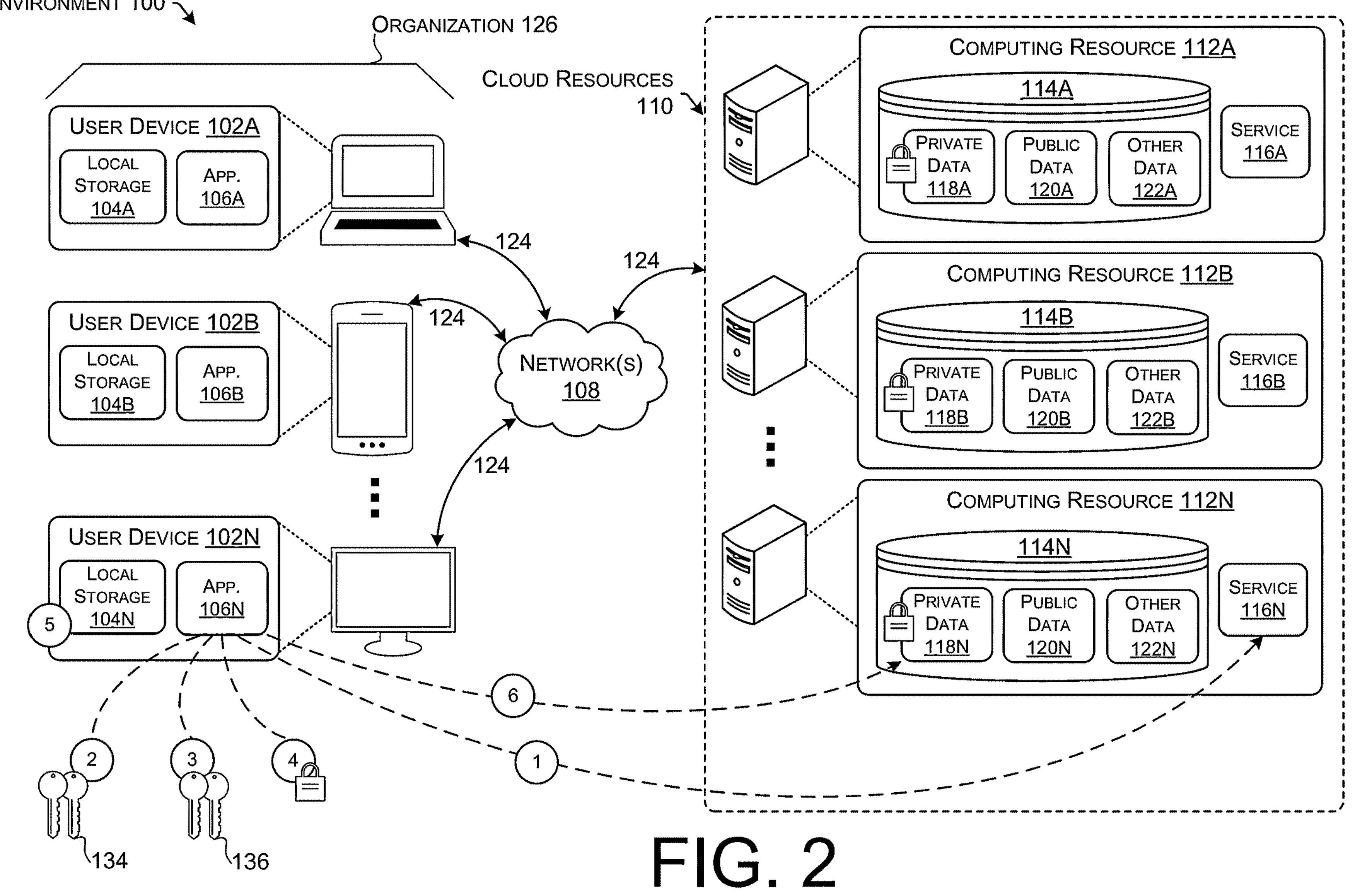
Figure 3:
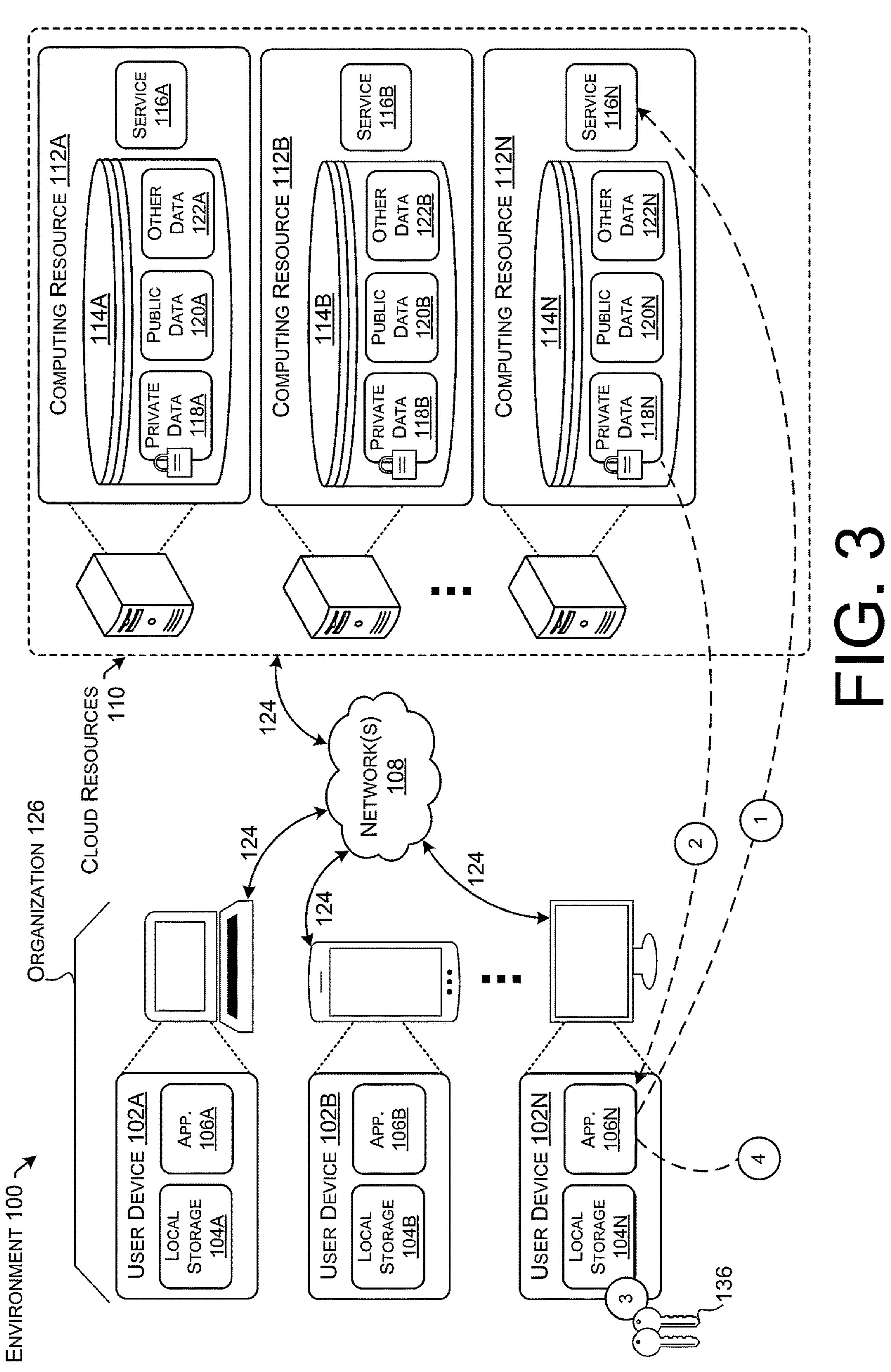

FIGS. 1-3 collectively illustrate an example environment 100 in accordance with the present serverless identity management concepts. Example environment 100 may include user devices 102 (e.g., end user client device, etc.). User devices 102 may include various elements, such as local storage 104 and/or an application 106. Example environment 100 may include a network 108. Example environment 100 may also include cloud resources 110 (e.g., the cloud). Cloud resources 110 may generally include a variety of computing resources 112. The computing resources 112 may include and/or be associated with various elements, such as storage 114 and/or a service 116. The storage 114 may include, private data storage 118, public data storage 120, and/or other data storage 122, for example. In FIGS. 1-3, the use of letters after a reference number is intended to distinguish like elements. Use of the reference number without the associated letter is generic to the element. For instance, three user devices 102 are depicted in FIGS. 1-3, including user device 102A, user device 102B, and user device 102N, representing any number of user devices 102. In FIGS. 1-3, user devices 102A, 102B, and 102N are depicted as a laptop, a mobile device, and a desktop computer, respectively. The depiction of any particular type of device is for illustration purposes only and is not meant to be limiting; a wide variety of devices are contemplated as a user device 102.

Within the example environment 100, user devices 102, computing resources 112, and/or other devices may exchange communications (e.g., packets) via a network connection(s) to cloud computing network 108, indicated by double arrows 124. For instance, network connections 124 may be transport control protocol (TCP) network connections or any network connection (e.g., information-centric networking (ICN)) that enables a user device 102 to exchange packets with other devices via cloud computing network 108. The network connections 124 represent, for example, data paths between user devices 102 and computing resources 112. It should be appreciated that the term "network connection" may also be referred to as a "network path." The use of a cloud computing network in this example is not meant to be limiting. Other types of networks are contemplated in accordance with serverless identity management concepts.

In some examples, the user devices 102 depicted in environment 100 may be associated with an organization 126 (e.g., corporation, employer, club, group). Stated another way, multiple users across an organization 126 may have one or more user devices 102. The user devices 102 may run an application in association with serverless identity management functions, such as application 106 (e.g., client application). The users associated with user devices 102 may include end users, administrators, managers, etc. Note that some users may be both an end user and an administrator. In some examples, encryption keys may be stored in local storage 104 of a user device 102. Local storage 104 could be any suitable storage media that is available to a user device 102, including a file system, an operating system (OS) keychain, an external universal serial bus (USB), a hardware security module (HSM), a hardware system on a chip, etc. The application 106 may include logic such as identity management and/or signing operations, key encryption operations for signing authority keys, identity keys and/or application private state, end-to-end encrypted communications encryption key generation and/or exchange, collaboration and communications operations (e.g., media encryption), etc.

In some examples, the cloud resources 110 may be viewed as resources that the organization 126 uses, but are external to the organization. As such, the cloud resources 110 may be untrusted by the organization 126, and therefore untrusted by any user device 102 of the organization 126. A variety of information used by organization 126 may be stored in storage 114 of the computing resources 112; however, care may be taken to avoid causing a security issue with information in the relatively untrusted cloud resources 110. For example, encrypted private data of the organization may be stored in computing resources 112, such as in private data storage 118. The "lock" symbol on private data storage 118 in FIG. 1 is meant to suggest that any data stored in private data storage 118 are encrypted, so that cloud resources 110 are not able to access the data. Private data storage 118 may be used to store data including signing authority private keys, identity private keys, application state private data (e.g., MLS ratchet trees), etc. In some examples, public data storage 120 in computing resources 112 may include public identity information. For instance, public data storage 120 may allow users of the organization 126 to search for one another. In some cases, only the public key part of an identity may be stored unencrypted in storage 114, along with any signature chains, for instance. Other data storage 122 may include service configuration data, for example. Service configuration data may include relevant configuration data for running a service 116, such as a collaboration and/or communication service. A collaboration and communications service could enable any number of communication modalities, including audio and/or video meetings, audio and/or video calls, push-to-talk, text-based chat, content sharing, messaging, etc. In some cases, the service 116 may provide role-based access control (RBAC) to data stored in storage 114 based on credentials and/or a role of an accessing user, for instance.

FIG. 1 shows an example hierarchy that may be consistent with serverless identity management concepts. In FIG. 1, the hierarchy is depicted using numbered circles, 1-3, with each numbered circle representing a hierarchical level. In some examples, the hierarchy may be an encryption key hierarchy, for instance. The example hierarchy may be viewed as an order in which various keys may be used to decrypt data consistent with serverless identity management techniques.

At Step 1 of the example hierarchy in FIG. 1, application 106 may use a local key 128 stored in local storage 104A of user device 102A to retrieve and decrypt a cloud key 130 stored in private data storage 118A of computing resource 112A.

At Step 2 of the example hierarchy in FIG. 1, application 106 may use the cloud key 130 to decrypt a private data key 132 stored in local storage 104A of user device 102A.

At Step 3 of the example hierarchy in FIG. 1, application 106 may use the private data key 132 stored in local storage 104A of user device 102A to decrypt any private data that it has downloaded from the cloud, such as from private data storage 118, for example.

Stated another way, private data for any given user may be stored encrypted in private data storage 118 in cloud resources 110 using private data key 132. The private data key 132 is stored, encrypted, at the user device 102. The private data key 132 is encrypted using the cloud key 130, which is stored in private data storage 118 in cloud resources 110. The cloud key 130 may be unique per user and/or per user device 102. The cloud key 130 is also encrypted, using the local key 128, which is stored in local storage 104 of a user device 102. The local key may also be unique per user and/or per user device 102.

In the example hierarchy, the local key 128 stored on a user device 102 does not directly decrypt private data, but instead decrypts an intermediate encryption key (the cloud key 130) that is stored in the cloud. In accordance, application 106 may have access to the encrypted data key 132. However, application 106 may not have a local copy of, or direct access to, the unencrypted data key 132 and/or the encrypted or unencrypted cloud key 130. In some examples, application 106 may be able to receive a copy of the encrypted cloud key 130 from cloud resources 110 in an instance where a user of user device 102 authenticates against the cloud. For example, the user may login. After successful authentication by the user, the application 106 may download the encrypted cloud key 130. Application 106 may then be able to use the local key 128 to retrieve the unencrypted cloud key 130. Then application 106 can use the cloud key 130 to decrypt the data key 132.

Serverless identity management may provide several advantages for network operations and security for an organization. For example, signing authority private keys may be stored encrypted in an untrusted cloud using keys that the untrusted cloud cannot access. Additionally, user identity information and/or any application state private keys may be stored encrypted in an untrusted cloud using keys that the untrusted cloud cannot access. Also, decryption keys may be stored in local storage across multiple user devices of an organization. For these reasons, there may be no need to run a key storage service on premises for an organization. Furthermore, the public root of trust for an organization, any external organization root of trust (as authorized by administrators of the organization), and/or any required application private state (depending on the use case) may also be stored encrypted along with user identity private keys in the untrusted cloud.

With serverless identity management, the cloud may grant authorized users access to encrypted private keys, but may not decrypt and/or access unencrypted private keys itself. Further, in an instance where a user device 102 or cloud resources 110 are compromised, the private data of the organization may remain secure. For example, note that compromised user device 102 storage may not provide access to private data decryption keys. In an instance where a malicious actor compromises user device 102 local storage 104 and obtains a copy of both the local key 128 and the encrypted data key 132, the actor may still not have the keys necessary to decrypt private data stored in the cloud. In another example, note that compromised cloud resources 110 storage 114 may not provide access to private data decryption keys. In an instance where a malicious actor compromises cloud resources 110 storage 114 and obtains a copy of both the encrypted cloud key 130 and the encrypted private data at private data storage 118, the actor may still not have the keys necessary to decrypt the private data.

Another advantage of serverless identity management includes case of revocation of access to private keys and/or private data stored in cloud resources. Revocation may not require having to rotate keys, for instance. In some examples, access revocation for any particular user may be achieved by simply deleting, from cloud storage, the cloud key(s) 130 associated with the particular user. Similarly, access revocation for a specific user device 102 may be achieved by deleting the cloud key 130 associated with the specific user device 102 from cloud storage.

Serverless identity management concepts may offer management flexibility through not placing restrictions on a root of trust hierarchy, and not needing to specify a particular encoding for identity key pairs and signing authority keypairs. For example, the root of trust may be based on a variety of schemes, such as an Rivest-Shamir-Adleman (RSA) keypair, an elliptic curve (EC) keypair, etc. The root of trust may be encoded in a variety of formats, such as an X509 structure, or in a custom or proprietary format. In some examples, the root of trust keypair may directly sign the identity key pair(s). In other examples, the root of trust keypair may sign an intermediate signing authority key pair(s), and the intermediate may in turn sign the identity key pair(s). Note that any number of layers of intermediate signing authority keypairs may be possible, and no restrictions may be placed on the hierarchy depth.

In another example of flexibility afforded to management, encrypted data may be encrypted with different keys. For instance, depending on their role, administrators or end users may have access to different encryption keys, and may be able to access and decrypt different data. In some cases, administrators, but not end users, may be able to access organization signing authority keys. End users may be able to access their individual identity keys and any relevant personal application private state data, for instance.

FIG. 2 illustrates an example signing authority bootstrap process. The example shown in FIG. 2 may be viewed as a scenario in which a private root of trust may be bootstrapped into an untrusted cloud, in accordance with the present serverless identity management concepts. For illustration purposes, user device 102N may be viewed as an administrator device (e.g., admin client device, etc.) in this scenario. In other scenarios, any authorized user at a user device 102 may be permitted to perform the bootstrap process. In FIG. 2, the example signing authority bootstrap process is depicted using numbered circles and/or dashed arrows, representing Steps 1-6 of the process.

In Step 1 of FIG. 2, user device 102N sends login information to computing resource 112N. Stated another way, an authorized user of user device 102N, such as an administrator that wants to bootstrap trust for organization 126, logs into service 116N (e.g., the cloud service).

In Step 2 of FIG. 2, the user generates a signing authority keypair 134 on user device 102N.

In Step 3 of FIG. 2, the user generates encryption keys 136. The encryption keys 136 may include a data key, which may be similar to data key 132 discussed relative to FIG. 1. The data key may be used to encrypt the signing authority, for instance. The encryption keys 136 may include a cloud key, which may be similar to cloud key 130 discussed relative to FIG. 1. The cloud key may be used to encrypt the data key, for instance. The encryption keys 136 may also include a local key, which may be similar to local key 128 discussed relative to FIG. 1. The local key may be used to encrypt the cloud key, for instance.

In Step 4 of FIG. 2, the user uses the encryption keys 136 (e.g., the data key) to encrypt the signing authority private key of signing authority keypair 134.

In Step 5 of FIG. 2, the user stores the encrypted data key and the local key in local storage 104N. The signing authority keypair 134 is not stored in local storage 104N.

In Step 6 of FIG. 2, the user uploads the encrypted signing authority private keypair 134 to cloud resources 110. For instance, the encrypted signing authority private keypair 134 may be stored in private data storage 118N of computing resource 112N. User device 102N does not keep a local copy of the signing authority keypair 134 after it is uploaded to cloud resources 110. The user may also upload the encrypted cloud key to cloud resources 110.

In some examples, the user (e.g., administrator) may manage identities for organization 126 by establishing rules for other users to access private data and/or keys in cloud resources 110. For example, the user may configure rules (e.g., RBAC rules) in cloud resources 110 to allow other authorized users to access the encrypted signing authority private keypair 134. Note that granting access to a new authorized user to the encrypted signing authority private keypair 134 alone does not grant access to the unencrypted signing authority private keys. Permission and/or encryption keys (e.g., encryption keys 136) must be shared with the new authorized user via a different route first, such as out-of-band.

FIG. 3 illustrates an example signing authority access process. The example shown in FIG. 3 may be viewed as a scenario in which an authorized user gains access to private root of trust signing authority keypair 134 (described relative to FIG. 2) that are stored in an untrusted cloud, in accordance with the present serverless identity management concepts. Some aspects of the example shown in FIG. 3 may be similar to aspects of the examples described above relative to FIG. 1 and/or FIG. 2. Therefore, for sake of brevity, not all elements of FIG. 3 will be described in detail.

In Step 1 of FIG. 3, an authorized user logs into service 116N from user device 102N.

In Step 2 of FIG. 3, the user downloads the encrypted signing authority private key of the signing authority keypair 134 from cloud resources 110 to their local user device 102N.

In Step 3 of FIG. 3, the user retrieves encryption keys 136 (described relative to FIG. 2) from local storage 104N.

In Step 4 of FIG. 3, the user decrypts the signing authority private key using one or more of the encryption keys 136 retrieved from local storage 104N. Note that the decryption process may follow the hierarchy described relative to FIG. 1. For example, the cloud key may be decrypted using the local key, the data key may be decrypted using the cloud key, and then the signing authority private key may be decrypted using the data key.

Once the signing authority private key is decrypted, the user may then use the signing authority keys to create and sign new identities. Thus, serverless identity management techniques allow multiple authorized users to access signing authority keys and sign identities without the need for a dedicated signing authority service (e.g. a certificate authority), and without the need for the private keys to be distributed and kept in synch across multiple different authorized user client machines. For instance, there may be no need to run a private certificate authority (CA) on premises at the organization. In this manner, application 106 may operate as signing authority software distributed across multiple user devices 102.

Figure 4:
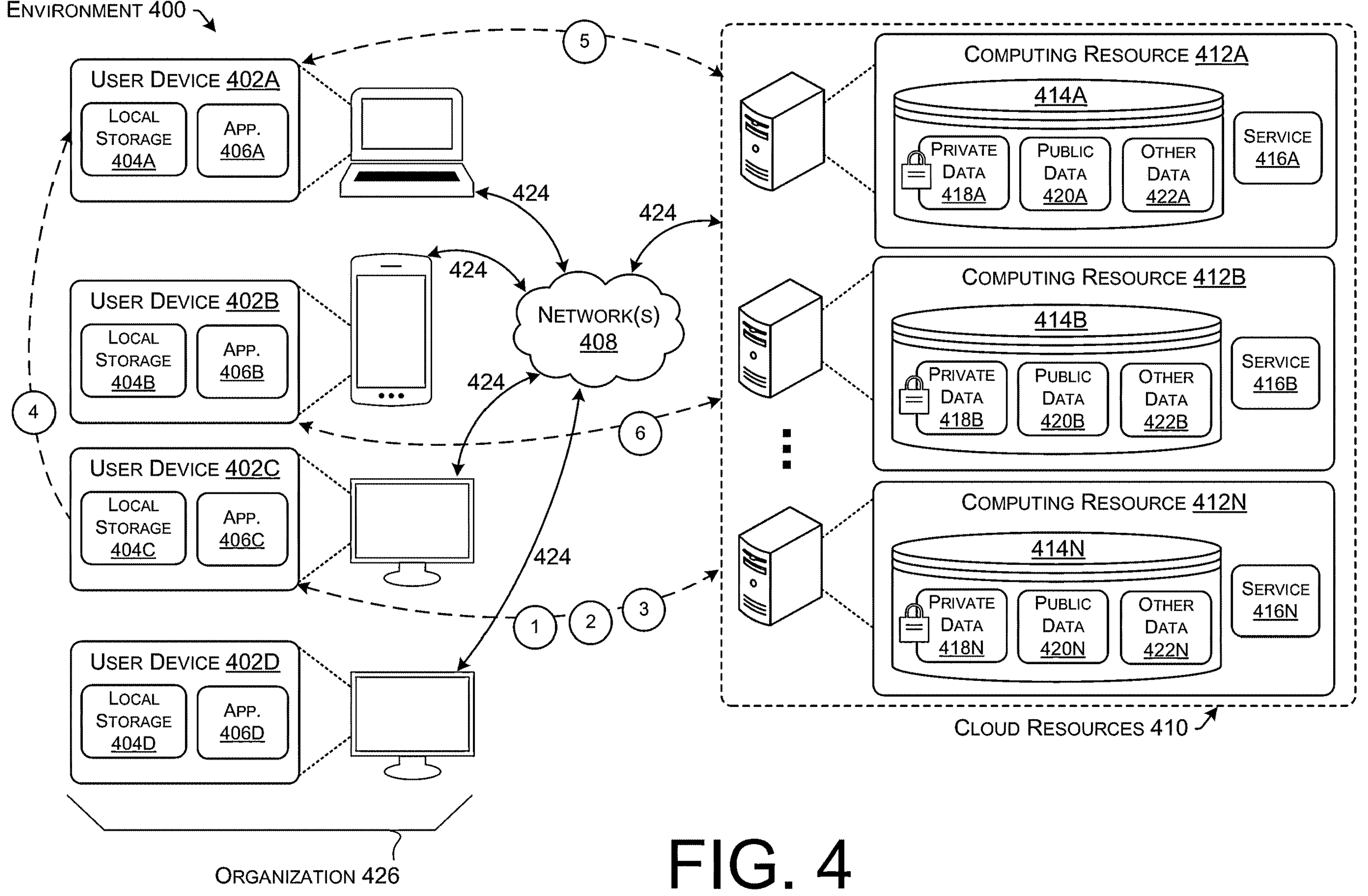

FIG. 4 illustrates an example environment 400 which may include an architecture that can be used to enable end-to-end encrypted communications consistent with serverless identity management concepts. Some aspects of the example shown in FIG. 4 may be similar to aspects of the examples described above relative to FIGS. 1-3. Therefore, for sake of brevity, not all elements of FIG. 4 will be described in detail. For instance, a user device 402 in FIG. 4 may be similar to a user device 102 described relative to FIGS. 1-3.

In the example depicted in FIG. 4, the user devices 402 may be viewed as corresponding to two classes of users: administrators and end users. In this example, the end users correspond to user device 402A and user device 402B, while the administrators correspond to user device 402C and user device 402D. The administrators may create, sign, and/or provision end user identities using the root of trust. The end users may use their assigned end user identities to establish end-to-end encrypted (E2EE) communications with other end users. Note that the scenario described relative to FIG. 4 may be viewed as a logical separation of functionality; in some examples an administrator may function as an end user as well. The scenario discussed below may take place after a signing authority bootstrap process (e.g., the signing authority bootstrap process described relative to FIG. 2).

In Step 1 of FIG. 4, an authorized administrator at user device 402C may log into service 416N, and may download the encrypted signing authority keys from private data storage 418N at computing resource 412N, for instance.

In Step 2 of FIG. 4, the administrator may decrypt the encrypted signing authority keys using the encryption keys stored in local storage 404C. The administrator may then create and/or sign an identity and associated keys for an end user, such as an end user associated with user device 402A. For example, the administrator may create a private signing key for the user associated with user device 402A. The administrator may also create keys for the user similar to the keys described relative to FIG. 1 above, including a data key, a cloud key, and a local key. The administrator may also encrypt the various keys, such as with the hierarchy described above relative to FIG. 1. For instance, the local key may encrypt the cloud key, the cloud key may encrypt the data key, and the data key may encrypt the private signing key. The administrator may include a signing authority root of trust public key in the encrypted envelope along with the identity keys. The administrator may also include roots of trust for external organizations for which the administrator authorizes the end user to communicate.

In Step 3 of FIG. 4, the administrator uploads and provisions the encrypted end user identity from user device 402C to cloud resources 410. The administrator may also upload the encrypted cloud key to the cloud resources 410. The administrator may also configure suitable policy rules (e.g., RBAC) that will allow the end user, and where appropriate any other authorized entities, to access the encrypted end user identity in cloud resources 410. Note that the local key may not be sent to the cloud resources 410.

In Step 4 of FIG. 4, the administrator transmits the local key for the identity associated with user device 402A from user device 402C to user device 402A. The transmission may be performed using any suitable out-of-band mechanism. The end user provisions the local key in their local storage 404A at user device 402A.

In Step 5 of FIG. 4, the end user may log in to service 416A, for instance, and may download their encrypted identity keys from private data 418A at computing resource 412A. The end user may use the local key from local storage 404A to decrypt the identity keys. Also, the end user may use the local key from local storage 404A to decrypt the signing authority root of trust public key.

In Step 6 of FIG. 4, the end user may then use the identity keys for any application-specific use case. For example, the identity keys may be used as the basis for deriving content/media encryption keys for establishing E2EE communications with other end users, such as an end user at user device 402B. E2EE encryption key derivation can be achieved by any suitable key derivation mechanism, such as MLS. End users that are communicating with each other may be able to verify the identity of any other user. End user may also be able to ensure that the identities are signed by a key hierarchy that chains back to the signing authority root of trust public key. Further, end users may be able to verify the identity of other users in external trusted organizations in instances where an administrator has included external roots of trust in a configuration package, for example. Note that communication between user device 402A and user device 402B, such as E2EE communications, may occur via cloud resources 410, such as via service 416A.

To summarize, the serverless identity management techniques described herein may improve management of identities and security for an organization. The techniques may enable creation of identities that are signed public/private key pairs, with the signing authority that signs these identities remaining under organizational control at all times. The signing authority may also be based on public/private key pairs. The identity keys may be used for multiple use cases, including digital signatures and authentication, data integrity, non-repudiation, cryptographic group key establishment (e.g., via MLS), and establishing end-to-end encrypted communications via an untrusted cloud service using any suitable E2EE protocol, for instance. Thus, the technique of operating a signing authority distributed across multiple user devices of an organization presents a lightweight, secure, and serverless solution for identity management.

Figure 5:
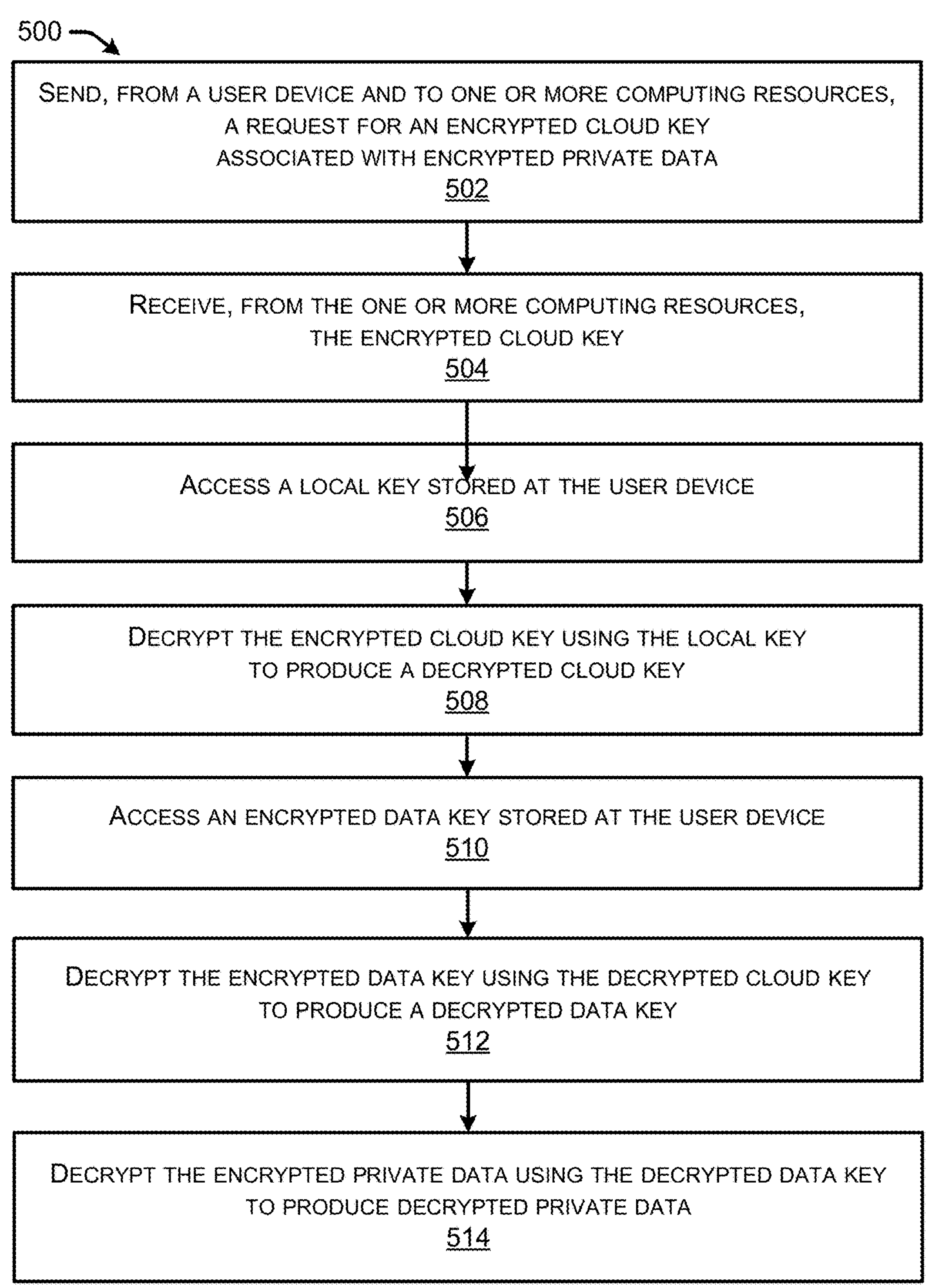
FIGS. 5 and 6 illustrate flow diagrams of example methods for the use of serverless identity management techniques as a part of communications among network devices, in accordance with the present concepts.
Figure 6:
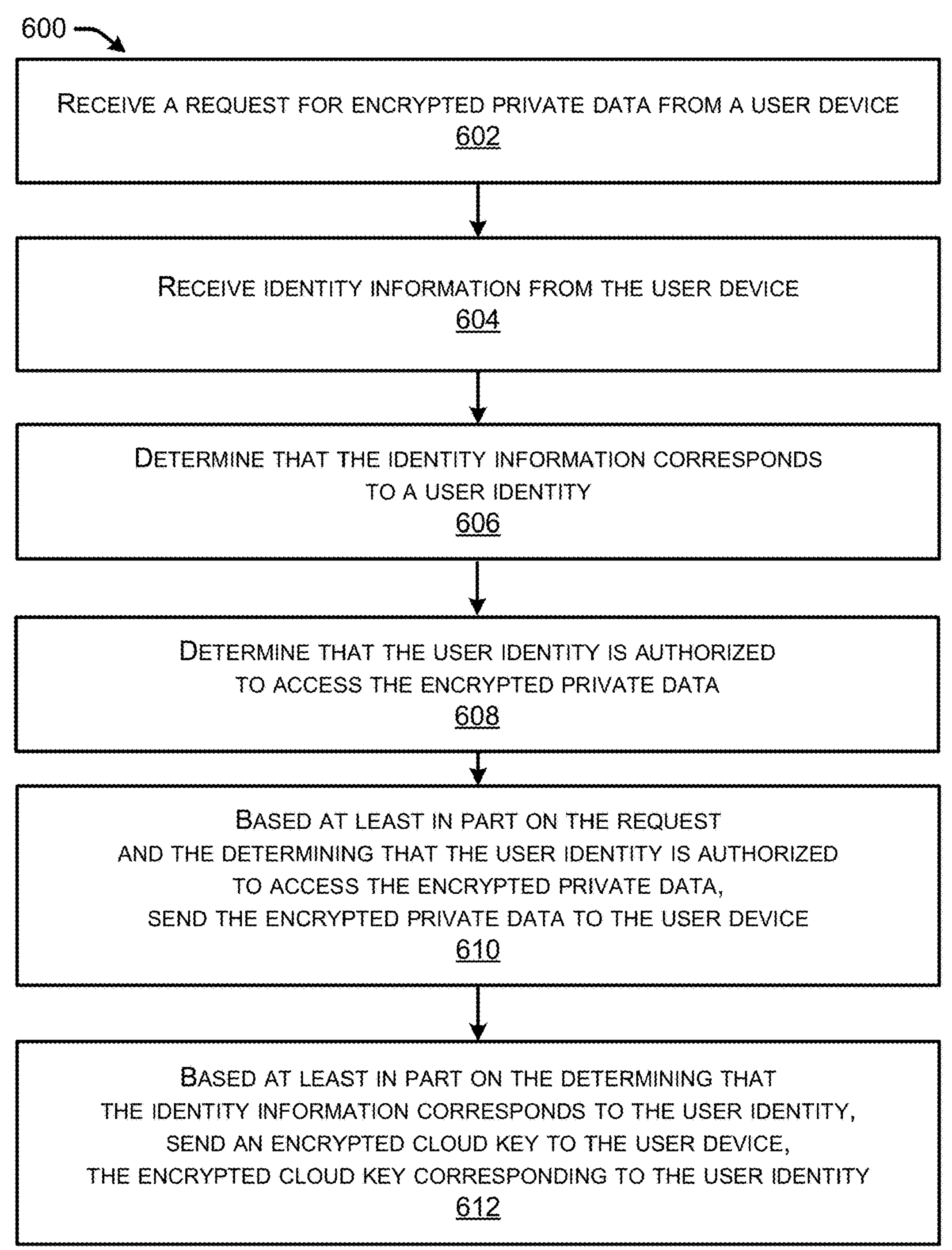

FIGS. 5 and 6 illustrate flow diagrams of example methods 500 and 600 that include functions that may be performed at least partly by a network device, such as user devices 102 or 402 described relative to FIGS. 1-4. The logical operations described herein with respect to FIGS. 5 and 6 may be implemented (1) as a sequence of computer-implemented acts or program modules running on a computing system and/or (2) as interconnected machine logic circuits or circuit modules within the computing system.

The implementation of the various devices and/or components described herein is a matter of choice dependent on the performance and other requirements of the computing system. Accordingly, the logical operations described herein are referred to variously as operations, structural devices, acts, or modules. These operations, structural devices, acts, and modules may be implemented in software, in firmware, in special purpose digital logic, and any combination thereof. It should also be appreciated that more or fewer operations might be performed than shown in the FIGS. 5 and 6 and described herein. These operations may also be performed in parallel, or in a different order than those described herein. Some or all of these operations may also be performed by components other than those specifically identified. Although the techniques described in this disclosure is with reference to specific devices, in other examples, the techniques may be implemented by less devices, more devices, different devices, or any configuration of devices and/or components.

FIG. 5 illustrates a flow diagram of an example method 500 for a user device to perform serverless identity management techniques. Method 500 may be performed by a user device (e.g., user device 102 or 402) communicatively coupled to one or more computing resources (e.g., computing resources 112 or 412), for instance. In some examples, method 500 may be performed by a computing device comprising one or more processors and one or more non-transitory computer-readable media storing computer-executable instructions that, when executed by the one or more processors, cause the one or more processors to perform method 500.

At 502, method 500 may include sending, from a user device and to one or more computing resources, a request for an encrypted cloud key associated with encrypted private data. Note that the one or more computing resources may or may not be cloud computing resources. In some examples, serverless identity management concepts may be applied to accessing information from any server in a relatively untrusted location.

At 504, method 500 may include receiving, from the one or more computing resources, the encrypted cloud key. In some examples, method 500 may also include sending, from the user device and to the one or more computing resources, a request for the encrypted private data. Method 500 may also include receiving the encrypted private data from the one or more computing resources. Note that the request for the encrypted cloud key may in effect represent a request for the encrypted private data, or vice versa. A service may be programmed to recognize that the user device would need the encrypted cloud key to be able to access the encrypted private data, for instance. In some examples, the encrypted private data may be received from a different computing resource of the one or more computing resources than the encrypted cloud key. For instance, data and/or encryption keys may be provided to any particular user device in a distributed fashion from the one or more computing resources.

Method 500 may also include sending, from the user device and to the one or more computing resources, identity information for a user identity associated with the user device. For example, a user may need to log into a service with user identity information in order to access data and/or encryption keys from the computing resources. Therefore, receiving the encrypted cloud key from the one or more computing resources may be based on the sending the identity information to authenticate to the cloud service. In some examples, the the encrypted cloud key may also be associated with the user identity. For instance, the encrypted cloud key may be unique to the user identity.

At 506, method 500 may include accessing a local key stored at the user device. At 508, method 500 may include decrypting the encrypted cloud key using the local key to produce a decrypted cloud key. At 510, method 500 may include accessing an encrypted data key stored at the user device. At 512, method 500 may include decrypting the encrypted data key using the decrypted cloud key to produce a decrypted data key. The decryption Steps of 508 and 512 may be ordered in accordance with a key hierarchy, such as the key hierarchy described above relative to FIG. 1.

At 514, method 500 may include decrypting the encrypted private data using the decrypted data key to produce decrypted private data. In some examples, the private data may be associated with an end-to-end encrypted communications service. For instance, a user of the user device may be able to participate in end-to-end encrypted communications with another user via the serverless identity management techniques of accessing encrypted private data.

FIG. 6 illustrates a flow diagram of an example method 600 for one or more computing resources to perform serverless identity management techniques. Method 600 may be performed by one or more computing resources (e.g., computing resources 112 or 412) communicatively coupled to one or more user devices (e.g., user device 102 or 402), for instance. In some examples, method 600 may be performed by one or more computing devices comprising one or more processors and one or more non-transitory computer-readable media storing computer-executable instructions that, when executed by the one or more processors, cause the one or more processors to perform method 600.

At 602, method 600 may include receiving a request for encrypted private data from a user device. At 604, method 600 may also include receiving identity information from the user device. At 606, method 600 may include determining that the identity information corresponds to a user identity. At 608, method 600 may also include determining that the user identity is authorized to access the encrypted private data. In some examples, method 600 may include receiving the user identity from an administrator device. Determining that the identity information corresponds to a user identity that is authorized to access the encrypted private data may include comparing or checking the identity information to the user identity received from an administrator device or another authorized device, for instance.

At 610, based at least in part on the request and the determining that the user identity is authorized to access the encrypted private data, method 600 may include sending the encrypted private data to the user device.

At 612, based at least in part on the determining that the identity information corresponds to the user identity, method 600 may include sending an encrypted cloud key to the user device. In some examples, the encrypted cloud key may correspond to the user identity. The encrypted cloud key may be encrypted using a local key of the user device, in some cases. Method 600 have further include receiving the encrypted cloud key from an administrator device or another authorized device, for instance. Furthermore, method 600 may include receiving a root of trust public key from an administrator device, wherein the root of trust public key is associated with the user identity.

Note that method 600 may include providing private data to multiple user devices. As such, many of the steps of method 600 may be repeated to service another user device. For example, method 600 may include receiving a second request for the encrypted private data from a second user device and receiving second identity information from the second user device. Method 600 may include determining that the second identity information corresponds to a second user identity that is authorized to access the encrypted private data. Based on the second request and determining that the second user identity is authorized to access the encrypted private data, method 600 may include sending the encrypted private data to the second user device. Lastly, based on determining that the second identity information corresponds to the second user identity, method 600 may include sending a second encrypted cloud key to the second user device. In some examples, the second encrypted cloud key may correspond to the second user identity.

Figure 7:
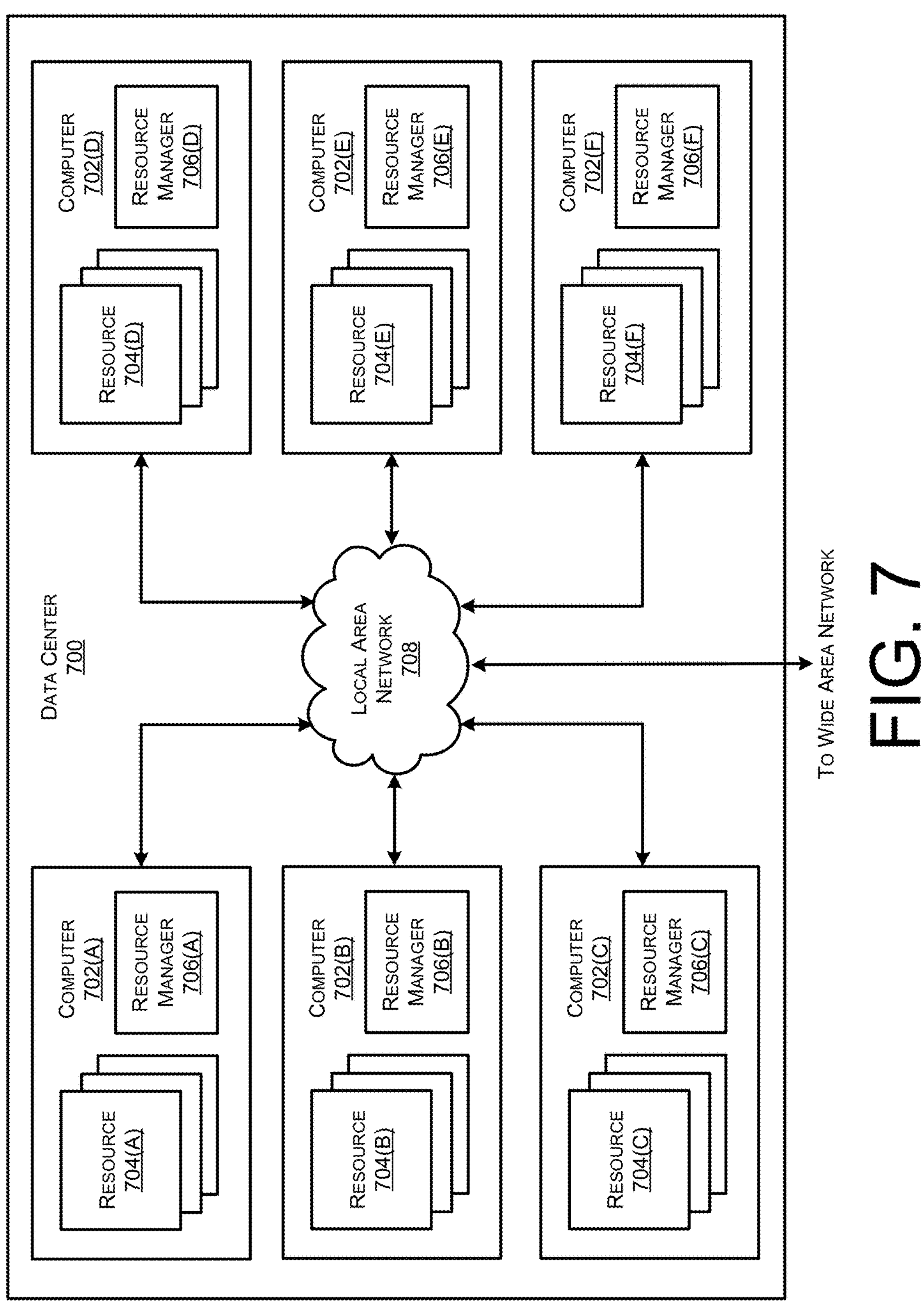
FIG. 7 illustrates a computing system diagram illustrating a configuration for a data center that can be utilized to implement aspects of the technologies disclosed herein.

FIG. 7 is a computing system diagram illustrating a configuration for a data center 700 that can be utilized to implement aspects of the technologies disclosed herein. The example data center 700 shown in FIG. 7 includes several computers 702A-702F (which might be referred to herein singularly as "a computer 702" or in the plural as "the computers 702") for providing computing resources. In some examples, the resources and/or computers 702 may include, or correspond to, any type of networked device described herein, such as a user device (102 or 402) and/or computing resource (112 or 412). Although, computers 702 may comprise any type of networked device, such as servers, switches, routers, hubs, bridges, gateways, modems, repeaters, access points, hosts, etc.

The computers 702 can be standard tower, rack-mount, or blade server computers configured appropriately for providing computing resources. In some examples, the computers 702 may provide computing resources 704 including data processing resources such as virtual machine (VM) instances or hardware computing systems, database clusters, computing clusters, storage clusters, data storage resources, database resources, networking resources, and others. Some of the computers 702 can also be configured to execute a resource manager 706 capable of instantiating and/or managing the computing resources. In the case of VM instances, for example, the resource manager 706 can be a hypervisor or another type of program configured to enable the execution of multiple VM instances on a single computer 702. Computers 702 in the data center 700 can also be configured to provide network services and other types of services.

In the example data center 700 shown in FIG. 7, an appropriate local area network (LAN) 708 is also utilized to interconnect the computers 702A-702F. It should be appreciated that the configuration and network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between data centers 700, between each of the computers 702A-702F in each data center 700, and, potentially, between computing resources in each of the computers 702. It should be appreciated that the configuration of the data center 700 described with reference to FIG. 7 is merely illustrative and that other implementations can be utilized.

In some examples, the computers 702 may each execute one or more application containers and/or virtual machines to perform techniques described herein. For instance, the containers and/or virtual machines may serve as server devices, user devices, and/or routers in the computing network 108 and/or 408.

In some instances, the data center 700 may provide computing resources, like application containers, VM instances, and storage, on a permanent or an as-needed basis. Among other types of functionality, the computing resources provided by a cloud computing network may be utilized to implement the various services and techniques described above. The computing resources 704 provided by the cloud computing network can include various types of computing resources, such as data processing resources like application containers and VM instances, data storage resources, networking resources, data communication resources, network services, and the like.

Each type of computing resource 704 provided by the cloud computing network can be general-purpose or can be available in a number of specific configurations. For example, data processing resources can be available as physical computers or VM instances in a number of different configurations. The VM instances can be configured to execute applications, including web servers, application servers, media servers, database servers, some or all of the network services described above, and/or other types of programs. Data storage resources can include file storage devices, block storage devices, and the like. The cloud computing network can also be configured to provide other types of computing resources 704 not mentioned specifically herein.

The computing resources 704 provided by a cloud computing network may be enabled in one embodiment by one or more data centers 700 (which might be referred to herein singularly as "a data center 700" or in the plural as "the data centers 700"). The data centers 700 are facilities utilized to house and operate computer systems and associated components. The data centers 700 typically include redundant and backup power, communications, cooling, and security systems. The data centers 700 can also be located in geographically disparate locations. One illustrative embodiment for a data center 700 that can be utilized to implement the technologies disclosed herein will be described below relative to FIG. 8.

Figure 8:
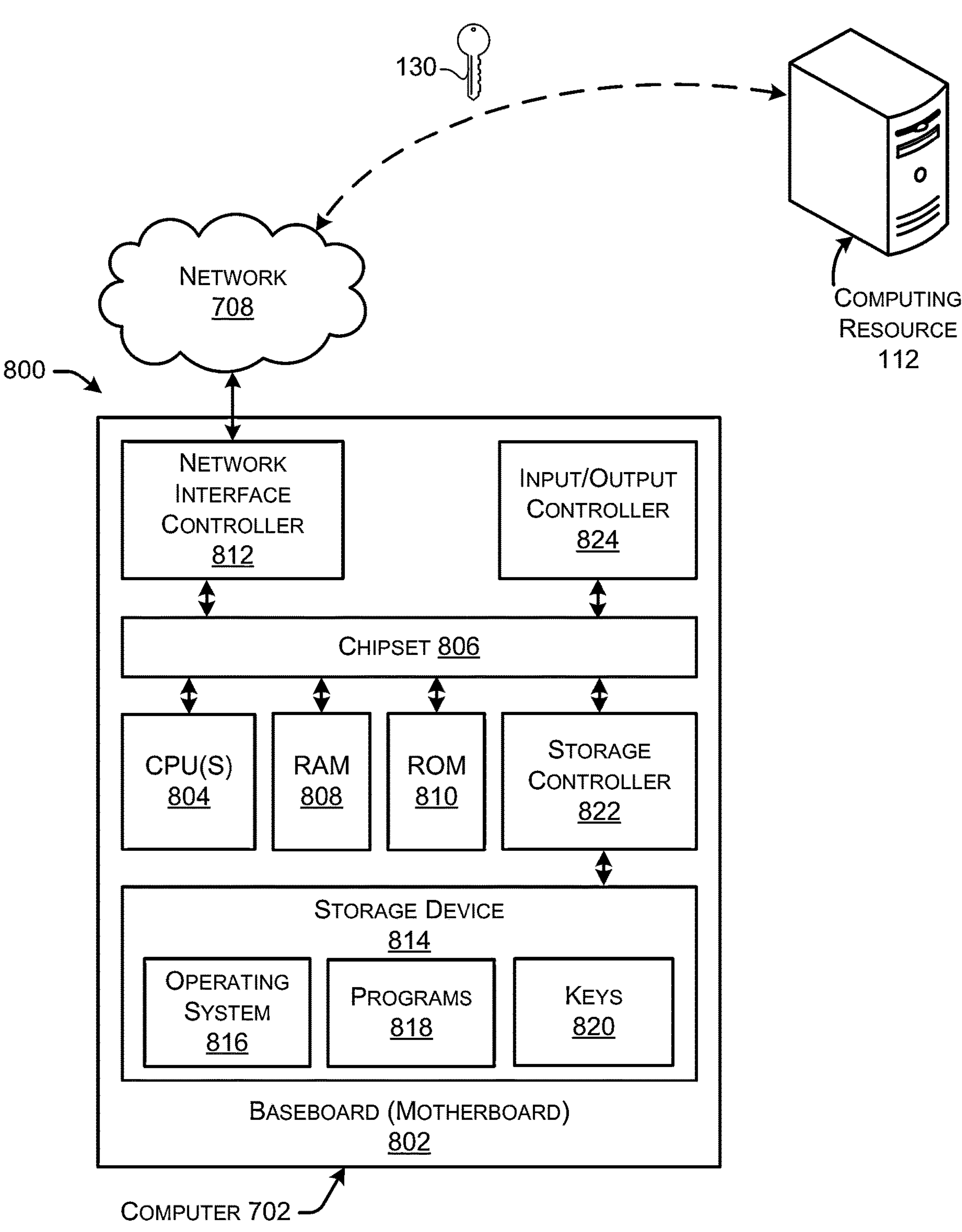
FIG. 8 is a computer architecture diagram showing an illustrative computer hardware architecture for implementing a device that can be utilized to implement aspects of the various technologies presented herein.

FIG. 8 shows an example computer architecture 800 for a computer 702 capable of executing program components for implementing the functionality described above. The computer architecture 800 shown in FIG. 8 illustrates a conventional server computer, workstation, desktop computer, laptop, tablet, network appliance, e-reader, smartphone, and/or other computing device, and can be utilized to execute any of the software components presented herein. The computer 702 may, in some examples, correspond to a physical device described herein (e.g., user device, computing resource, etc.), and may comprise networked devices such as servers, switches, routers, hubs, bridges, gateways, modems, repeaters, access points, etc. For instance, computer 702 may correspond to user device (102 or 402) and/or computing resource (112 or 412).

As shown in FIG. 8, the computer 702 includes a baseboard 802, or "motherboard," which is a printed circuit board to which a multitude of components or devices can be connected by way of a system bus or other electrical communication paths. In one illustrative configuration, one or more central processing units ("CPUs") 804 operate in conjunction with a chipset 806. The CPUs 804 can be standard programmable processors that perform arithmetic and logical operations necessary for the operation of the computer 702.

The CPUs 804 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 806 provides an interface between the CPUs 804 and the remainder of the components and devices on the baseboard 802. The chipset 806 can provide an interface to a RAM 808, used as the main memory in the computer 702. The chipset 806 can further provide an interface to a computer-readable storage medium such as a read-only memory ("ROM") 810 or non-volatile RAM ("NVRAM") for storing basic routines that help to startup the computer 702 and to transfer information between the various components and devices. The ROM 810 or NVRAM can also store other software components necessary for the operation of the computer 702 in accordance with the configurations described herein.

The computer 702 can operate in a networked environment using logical connections to remote computing devices and computer systems through a network, such as the networks 108, 408, and/or 708. The chipset 806 can include functionality for providing network connectivity through a network interface controller (NIC) 812, such as a gigabit Ethernet adapter. The NIC 812 is capable of connecting the computer 702 to other computing devices over the network 708. For instance, in the example shown in FIG. 8, NIC 812 may help facilitate transfer of data, encryption keys, packets, and/or communications, such as cloud key 130, over the network 708 with computing resource 112. It should be appreciated that multiple NICs 812 can be present in the computer 702, connecting the computer to other types of networks and remote computer systems.

The computer 702 can be connected to a storage device 814 that provides non-volatile storage for the computer. The storage device 814 can store an operating system 816, programs 818, keys 820, and/or other data, such as user identity information. The storage device 814 can be connected to the computer 702 through a storage controller 822 connected to the chipset 806, for example. The storage device 814 can consist of one or more physical storage units. The storage controller 822 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 702 can store data on the storage device 814 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 814 is characterized as primary or secondary storage, and the like.

For example, the computer 702 can store information to the storage device 814 by issuing instructions through the storage controller 822 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 702 can further read information from the storage device 814 by detecting the physical states or characteristics of one or more particular locations within the physical storage units.

In addition to the mass storage device 814 described above, the computer 702 can have access to other computer-readable storage media to store and retrieve information, such as policies, program modules, data structures, and/or other data. It should be appreciated by those skilled in the art that computer-readable storage media is any available media that provides for the non-transitory storage of data and that can be accessed by the computer 702. In some examples, the operations performed by the network 708, and or any components included therein, may be supported by one or more devices similar to computer 702. Stated otherwise, some or all of the operations performed by the network 708, and or any components included therein, may be performed by one or more computer devices 702 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, ternary content addressable memory (TCAM), and/or other optical storage, magnetic cassettes, magnetic tape, magnetic disk storage or other magnetic storage devices, or any other medium that can be used to store the desired information in a non-transitory fashion.

As mentioned briefly above, the storage device 814 can store an operating system 816 utilized to control the operation of the computer 702. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage device 814 can store other system or application programs and data utilized by the computer 702.

In one embodiment, the storage device 814 or other computer-readable storage media is encoded with computer-executable instructions which, when loaded into the computer 702, transform the computer from a general-purpose computing system into a special-purpose computer capable of implementing the embodiments described herein. These computer-executable instructions transform the computer 702 by specifying how the CPUs 804 transition between states, as described above. According to one embodiment, the computer 702 has access to computer-readable storage media storing computer-executable instructions which, when executed by the computer 702, perform the various processes described above relative to FIGS. 1-6. The computer 702 can also include computer-readable storage media having instructions stored thereupon for performing any of the other computer-implemented operations described herein.

The computer 702 can also include one or more input/output controllers 824 for receiving and processing input from a number of input devices, such as a keyboard, a mouse, a touchpad, a touch screen, an electronic stylus, or other type of input device. Similarly, an input/output controller 824 can provide output to a display, such as a computer monitor, a flat-panel display, a digital projector, a printer, or other type of output device. It will be appreciated that the computer 702 might not include all of the components shown in FIG. 8, can include other components that are not explicitly shown in FIG. 8, or might utilize an architecture completely different than that shown in FIG. 8.

As described herein, the computer 702 may comprise one or more devices, such as user devices (102 or 402), computing resources (112 or 412), and/or other devices. The computer 702 may include one or more hardware processors 804 (processors) configured to execute one or more stored instructions. The processor(s) 804 may comprise one or more cores. Further, the computer 702 may include one or more network interfaces configured to provide communications between the computer 702 and other devices, such as the communications described herein as being performed by user devices (102 or 402) and/or computing resources (112 or 412), and/or other devices. In some examples, the communications may include data, encryption keys, packets, requests, and/or other information transfer, for instance. The network interfaces may include devices configured to couple to personal area networks (PANs), wired and wireless local area networks (LANs), wired and wireless wide area networks (WANs), and so forth. For example, the network interfaces may include devices compatible with Ethernet, Wi-Fi™, and so forth.

The programs 818 may comprise any type of programs or processes to perform the techniques described in this disclosure in accordance with serverless identity management techniques. For instance, the programs 818 may cause the computer 702 to perform techniques for communicating with other devices using any type of protocol or standard usable for determining connectivity. Additionally, the programs 818 may comprise instructions that cause the computer 702 to perform the specific techniques for the employment of serverless identity management concepts.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative of some embodiments that fall within the scope of the claims of the application.

What is claimed is:

1. A computer-implemented method comprising:

receiving, at a first user device and from one or more computing resources, an encrypted signing authority private key;

decrypting the encrypted signing authority private key to generate a decrypted signing authority private key;

using the decrypted signing authority private key, generating:

an identity for an end user associated with a second user device, a local key associated with the identity, and an encrypted cloud key associated with the identity;

sending, from the first user device and to the one or more computing resources, the identity and the encrypted cloud key associated with the identity; and sending, from the first user device and to the second user device, the local key associated with the identity.

2. The computer-implemented method of claim 1, further comprising:

using the local key associated with the identity to encrypt the encrypted cloud key.

3. The computer-implemented method of claim 1, further comprising:

configuring a policy rule that allows the end user associated with the second user device to access the identity and the encrypted cloud key associated with the identity at the one or more computing resources.

4. The computer-implemented method of claim 1, further comprising:

logging in to a service at the one or more computing resources; and requesting the encrypted signing authority private key from the service.

5. The computer-implemented method of claim 1, wherein sending the local key associated with the identity to the second user device enables the second user device to decrypt a signing authority root of trust public key.

6. The computer-implemented method of claim 1, further comprising:

generating a different identity associated with a third user device and sending the different identity to the one or more computing resources to enable encrypted communication between the second user device and the third user device.

7. The computer-implemented method of claim 1, wherein the local key enables the second user device to establish encrypted communication with a third user device, the encrypted communication sent via the one or more computing resources.

8. A user device comprising:

one or more processors; and one or more non-transitory computer-readable media storing computer-executable instructions that, when executed by the one or more processors, cause the one or more processors to:

receive, from one or more computing resources, an encrypted signing authority private key;

decrypt the encrypted signing authority private key to generate a decrypted signing authority private key;

using the decrypted signing authority private key, generate:

an identity for an end user associated with a second user device, a local key associated with the identity, and a encrypted cloud key associated with the identity;

send, to the one or more computing resources, the identity and the encrypted cloud key associated with the identity; and send, from the user device and to the second user device, the local key associated with the identity.

9. The user device of claim 8, wherein the computer-executable instructions further cause the one or more processors to:

use the local key associated with the identity to encrypt the encrypted cloud key.

10. The user device of claim 8, wherein the computer-executable instructions further cause the one or more processors to:

configure a policy rule that allows the end user associated with the second user device to access the identity and the encrypted cloud key associated with the identity at the one or more computing resources.

11. The user device of claim 8, wherein the computer-executable instructions further cause the one or more processors to:

log in to a service at the one or more computing resources; and request the encrypted signing authority private key from the service.

12. The user device of claim 8, wherein sending the local key associated with the identity to the second user device enables the second user device to decrypt a signing authority root of trust public key.

13. The user device of claim 8, wherein the computer-executable instructions further cause the one or more processors to:

generate a different identity associated with a third user device and send the different identity to the one or more computing resources to enable encrypted communication between the second user device and the third user device.

14. The user device of claim 8, wherein the local key enables the second user device to establish encrypted communication with a third user device, the encrypted communication sent via the one or more computing resources.

15. A method comprising:

receiving, at a user device and from an administrator, a local key associated with a service;

receiving, at the user device and from cloud computing resources, an encrypted identity key associated with the service, the encrypted identity key related to an identity of an end user associated with the user device;

using the local key, by the user device, to decrypt the encrypted identity key, generating a decrypted identity key; and using the decrypted identity key, by the user device, to establish encrypted communications with a different user device associated with the service.

16. The method of claim 15, further comprising:

using the decrypted identity key, by the user device, to verify another identity of another end user associated with the different user device.

17. The method of claim 15, wherein the local key is received from the administrator out-of-band with respect to the cloud computing resources.

18. The method of claim 15, further comprising:

provisioning, by the user device, the local key in local storage at the user device.

19. The method of claim 15, further comprising:

sending a request, from the user device and to the cloud computing resources, to access private data stored at the cloud computing resources, the private data associated with the identity of the end user;

receiving the private data at the user device; and using the local key to decrypt the private data.

20. The method of claim 15, further comprising:

decrypting, by the user device and using the local key, a signing authority root of trust public key associated with the service.

* * * * *